May 12, 1953     O. G. LANDSVERK ET AL     2,638,553
NEUTRON DETECTOR
Filed Dec. 5, 1949
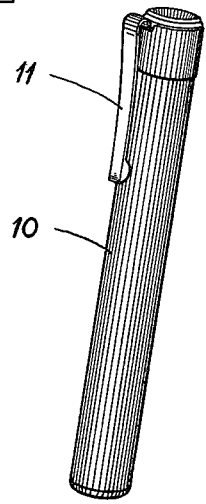
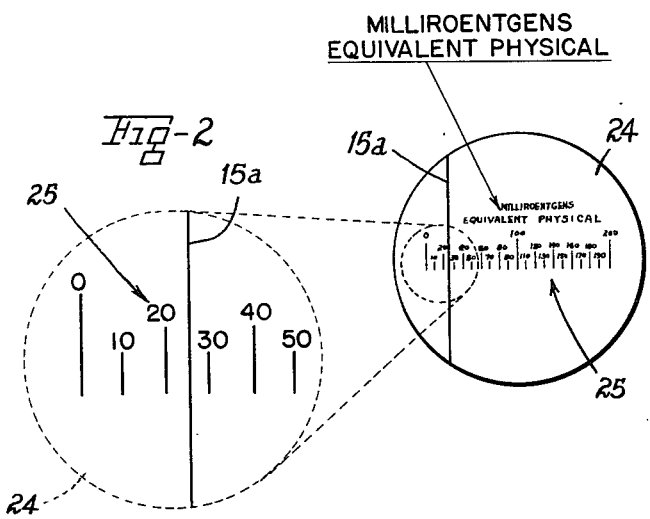
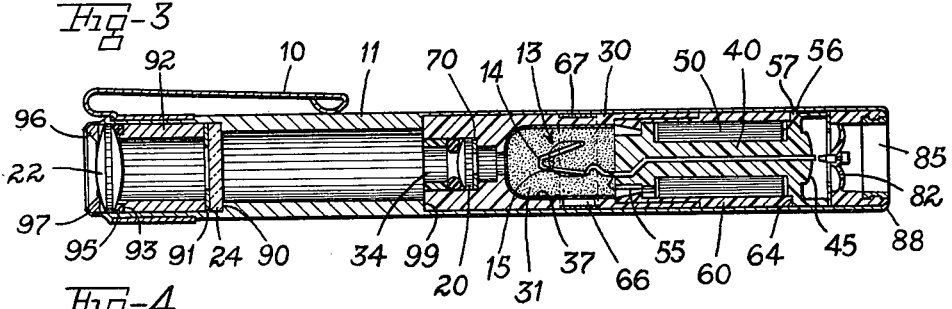
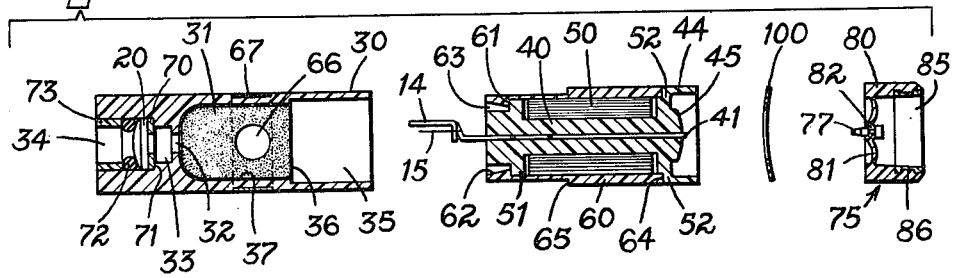
INVENTORS
Ole G. Landsverk
Leonard E. Rasmussen
BY
Marshall & Biebel
ATTORNEYS Patented May 12, 1953

2,638,553

UNITED STATES PATENT OFFICE 2,638,553

NEUTRON DETECTOR

Ole G. Landsverk and Leonard E. Rasmussen, Cincinnati, Ohio, assignors to Keleket X-Ray Corporation, a corporation of Ohio Application December 5, 1949, Serial No. 131,093

4 Claims. (Cl. 250—83.3)

This invention relates to devices for measuring radioactivity, and more particularly to instruments for measuring the amount of exposure to a slow or thermal neutron flux such as may result from radioactivity.

In connection with work having to do with radioactive materials and the like, it is highly important to provide proper protection for the personnel who are exposed to the radiation therefrom, and this is true of the slow or thermal neutrons which may be released from such materials, as well as the gamma radiation, both of which have destructive effects on human tissue. Experience has shown that there is a maximum permissible amount of exposure to these types of radioactivity to which individuals may safely be subjected in any period of time, while exposure in excess of that amount is dangerous, and it is important both to prevent it if possible and also to know promptly if it has inadvertently occurred in order that immediate attention may be given to corrective treatment.

Ordinarily gamma radiation is present wherever neutrons are being released, and it is therefore desirable to provide suitable integrating types of measuring devices sensitive to each of these types of radioactivity which may be carried directly upon the person of the individual who is engaged in this type of work, so that it will be with him constantly and thus subjected to the same radiation conditions to which he is subjected. By suitably calibrating the instruments, it thus becomes possible to ascertain at any time the total effective amount of radioactivity to which he has been subjected, and by proper periodic checks, to guard and protect him against excessive exposure, when the instruments indicate that he has reached or exceeded the maximum permissible amount of exposure for a given time interval.

It is accordingly important in such an instrument that it be light in weight, convenient to carry, relatively strong and rugged in construction and operation, making it possible for the user to carry it much as he would an instrument such as a fountain pen or the like, and without requiring conscious thought on his part, and with adequate assurance that when so carried and constantly associated with the wearer, it will properly integrate and indicate the summation of the radiation conditions to which he has been subjected.

A suitable device of these characteristics for measuring exposure to X- and gamma radiation includes an electrometer, such as a quartz fiber electrometer, which may be mounted in a tube or other suitable housing provided with a microscope and a scale for observing and measuring the movements of the fiber resulting from variation in the charge thereon. In the use of such an instrument, it is first charged by application of a predetermined electrical charge to the electrometer, causing a deflection of the fiber to occur to a position which may be conveniently indicated as a zero reading on the scale. When the device is subjected to X- or gamma radiation, the resulting ionization causes dissipation of the charge on the electrometer, and this in turn causes deflection of the fiber which is observed and measured upon the scale. Thus as the charge is progressively lost due to prolonged exposure to radiation, the fiber increasingly deflects towards the position it occupies in the absence of such charge, and thus the reading of the scale increases in accordance with the amount of radiation to which the user has been exposed since the device was charged.

As stated, an instrument of the above character will satisfactorily measure exposure to X- and gamma radiation in terms of the ionization caused by such radiation in the ionization chamber for the electrometer. However, since slow neutrons do not in themselves have any ionizing effect, devices of this character are not sensitive to a neutron flux. It has been discovered, however, that if the inner wall of the ionization chamber be provided with a coating containing a material which undergoes a neutron-alpha reaction when exposed to a slow neutron flux, measurement of the exposure to the flux can be made.

An electrometer device having a coating containing such a material, for example boron-10, in the ionization chamber is highly sensitive to slow neutrons, and since under ordinary conditions the neutrons released from a neutron source are largely slowed down by the provision of a wall of paraffin or other hydrogenous material in their path, the device will give an adequate measurement of the exposure to the slow neutron flux around the individual working with the neutron source. The device exhibits its sensitivity to slow neutrons by virtue of the fact that a slow neutron will enter the nucleus of a boron-10 atom and cause it to become unstable and to break down into lithium-7 accompanied by the release of an alpha particle of high ionizing power. This alpha particle ionizes the air in the ionization chamber in a manner comparable to the ionization directly caused by gamma radiation, and the resulting dissipation of the charge on the electrometer and deflection of the fiber may be observed and measured in the same way as with a gamma ray meter.

It is accordingly one of the principal objects of the present invention to provide an instrument of the above character which possesses sensitivity for slow neutrons many times greater than its sensitivity for gamma radiation, which is simple to construct in small and lightweight form for ready attachment to the clothes or person of the user, which will give a visual reading of the exposure to slow neutrons, and which is rugged and dependable in operation over a wide range of service conditions including temperature, moisture and shock.

Another object is to provide such a device which includes a microscope and an electrometer having a condenser connected therewith to provide the proper range of radiation response and which is incorporated in a hermetically sealed housing for dependable operation over a substantial exposure range without loss of accuracy even when immersed in water or other conducting fluid.

It is also an object of the invention to provide such a device wherein the wall of the ionization chamber for the electrometer has a lining containing a material which breaks down when exposed to a slow neutron flux and releases alpha particles which in turn ionize the air in the ionization chamber and thus cause dissipation of the charge on the electrometer in proportion to the exposure of the device to the slow neutron flux.

Other objects and advantages of the invention will be apparent from the following description, the accompanying drawing and the appended claims.

In the drawing—

Fig. 1 is a perspective view of a device constructed in accordance with the invention for measuring exposure to a slow neutron flux;

Fig. 2 is a somewhat diagrammatic view showing the image visible to the user of the device and including an enlarged fragment of the image for clarity of illustration;

Fig. 3 is a view of the device in longitudinal section and on an enlarged scale; and Fig. 4 is an exploded sectional view of certain of the component parts of the device taken at right angles to Fig. 3.

Referring to the drawing, which illustrates a preferred embodiment of the invention, the housing of the device is a barrel 10 of a material which will freely transmit the radiation to be measured. The barrel 10 is of approximately the same size and shape as a conventional fountain pen, and it is provided with a clip 11 for mounting the device in the pocket of the user, the ring portion of clip 11 being set in a circumferential groove in the barrel as shown in Fig. 3. As an example of suitable dimensions for the device, satisfactory results have been obtained with the barrel 10 formed of a tube of anodized aluminum approximately 3.9 inches in length and one-half inch in diameter, the dimensions of the other parts in the drawing being shown as in proportion to this size of tube.

Within the barrel 10 is the electrometer 13, which comprises an electrode 14 of Phosphor bronze or other suitable conducting material supporting a quartz fiber 15 soldered or otherwise secured thereto and provided with a conducting coating such as a sputtered coating of platinum.

The microscope includes an objective lens 20 and an eye-piece 22, and a glass disk 24 having scale designations 25 thereon is positioned between these lenses for measuring the position of fiber 15 as viewed through the microscope. Since slow neutrons cause damage to human tissues similar to that caused by gamma rays, a convenient unit for measuring exposure to a slow neutron flux is in terms of the physical damage equivalent to that caused by gamma rays measured in milliroentgens, and the scale is accordingly shown in Fig. 2 as calibrated in milliroentgens equivalent physical (M. R. E. P.) over a range of 200 M. R. E. P.

The electrometer 13 and the objective lens 20 are mounted in fixed relation as parts of a unitary subassembly within a separately formed housing 30 which forms an ionization chamber 31 for the electrometer. Three connecting passages 32, 33 and 34 of progressively greater diameter lead from the chamber 31 in the direction of the microscope, and at the opposite end of chamber 31, the housing 30 is formed with a large bore 35 terminating in an annular shoulder 36. It is desirable that the proportions of the housing 30 and chamber 31 and the average atomic number of the materials forming the walls of the chamber be such as to satisfy the Bragg-Gray conditions for an "air-wall" chamber, and satisfactory results from this standpoint have been obtained in a device as illustrated with the housing 30 formed of a molded plastic material such as black polystyrene.

The surface of ionization chamber 31 should be conducting and have no dead spots, and it should be grounded to the barrel 10. The non-conducting housing 30 is accordingly provided with a coating on the inner surface of the chamber 31 which is sufficiently conductive to remove positive ions formed in chamber 31 by radiation, such coating being continuous to its outer surface to assure electric contact with the barrel 10. The actual conductivity required for this coating is relatively low, tests indicating that a resistance of $10^8$ ohms is not too high, and satisfactory results have been obtained by dipping the housing in a suspension of colloidal graphite in a solvent for the material composing the housing, such as acetone in the case of polystyrene. The solvent softens the surface of the housing sufficiently to cause the graphite to be imbedded therein and thus to form the desired conducting coating, and loose particles remaining on the surface of the housing may then be readily removed by polishing in a lathe.

Since particles of the graphite may become detached during assembly of the device and enter the open part of the barrel between the objective lens 20 and the scale disk 24, tending to obscure proper reading of the instrument, it is desirable to limit the painting or dipping of the housing from the portion extending from its right-hand end in the drawing to approximately the level of the passage 32. If desired, the housing 30 may be formed of a material which itself possesses the desired conductivity, such as a phenolic resin containing a conducting material or a molded mixture of graphite and methyl methacrylate.

After the housing 30 has been treated to provide the desired conducting surface as described, the inner wall of chamber 31 is provided with a coating 37 containing a material which undergoes a neutron-alpha reaction when exposed to a slow neutron flux, such as boron or cadmium. It has been found that commercial finely ground 90% boron contains an adequate amount of boron-10 for accurate operation of the device, and a satisfactory mixture for forming the desired coating has been found to consist of two parts by volume of commercial boron to one part of the rubbery material sold under the trade-name "Insulex No. 22." To this mixture is added sufficient ethyl alcohol to reduce its consistency to approximately that of No. 10 motor oil, and since the boron tends to settle out rather rapidly, the mixture should be stirred thoroughly before and during use. An adequately uniform coating has been obtained by turning the housing 31 slowly in a lathe while applying the boron paint with a suitable swab.

The boron coating is reduced in sensitivity if it is too thin or if some spots therein are too thin, since in either event outer layers which might have contributed alpha particles capable of penetrating the inner layers and causing ionization in the chamber 31 are not present. On the other hand, when the coating is so thick that the alpha particles from the outer layer just barely reach the inner surface if they happen to be traveling in a direction perpendicular to the surface, no further addition of boron thickness will increase sensitivity. An adequately uniform and sensitive coating has been obtained by applying two layers of the paint mixed and thinned as described.

An insulator 40 is mounted within housing 30 and supports the electrometer 13 within the ionization chamber 31. This insulator also transmits light from the end of the barrel 10 for illuminating the electrometer, and it is desirable that the insulating properties of the insulator 40 be high, and also that the insulator transmit as much light as possible from the end of the barrel for illuminating the electrometer. Satisfactory results from the standpoint of both insulating and light transmitting properties have been obtained in a device having a range of 200 M. R. E. P. with this insulator molded from transparent polystyrene, and the electrode 14 includes angularly arranged portions as shown in Fig. 3 around which the insulator may be molded to provide for rigidly supporting the electrometer. The outer end 41 of the electrode projects beyond the outer end of the insulator to provide a charging connection for the electrometer, and this end portion of the insulator includes a tubular outer portion 44 proportioned to engage the inner surface of barrel 10 and an inner portion having a convex lens surface 45 formed thereon.

In addition to supporting the electrometer, the insulator 40 forms a spool on which is mounted a tubular condenser 50, the insulator having an elongated circumferential groove which receives the condenser between the shoulders 51 and 52 at each end of this groove. For an instrument designed to measure over a range of 200 M. R. E. P., satisfactory results have been obtained with a condenser having a capacitance of about 60 mmfd. and with polystyrene foil employed as the insulating material between the layers of metal foil. The positive lead 55 from the condenser passes through a small hole in the shoulder 51 and is wound around and soldered to the electrode 14. The negative lead 56 lies in a groove 57 in the shoulder 52 and along the outer surface of the portion 44 of insulator 40 in order to provide a ground connection to barrel 10 in the assembled device.

The electrometer-condenser unit is completed by a cylindrical sleeve 60 of insulating material such as polystyrene, which is formed with an annular shoulder 61 near its inner end to receive the outer end surface of the shoulder 51 of insulator 40 and which has its outer surface in two sections of different diameters for insertion within housing 30 and barrel 10, respectively. The sleeve 60 is beveled adjacent shoulder 61 as shown at 62, and the adjacent end of the insulator is formed of reduced diameter to provide a comparative deep annular groove 63 which forms an extended surface leakage path from the electrode 14, tending to reduce the loss of electrostatic charge. The outer end of sleeve 60 fits into a groove 64 in the shoulder 52, and the sleeve and insulator are preferably secured together at this point, which may readily be done by means of a solvent bond with acetone or another suitable mutual solvent.

Before the electrometer and insulator are assembled in the housing 30, the fiber 15 is provided with a suitable conducting coating, as by sputtering with platinum or other suitable metal. Also, if no precautions are taken, the presence of the wire electrode 14 will cause excessive photoelectric effect in the lower X-ray region. Therefore, in order to control secondary radiation from the electrode 14 resulting from the photoelectric effect of such gamma radiation as may be present in the area in which the device is used, and thus to assure the desired low level of response of the device to X- and gamma radiation, as much of the surface of the electrode as possible is coated with a suitable material of low atomic number, satisfactory results having been obtained by painting the electrode with a suspension of colloidal graphite in a carrier which will adhere to the electrode, such as the rubbery material sold under the trade name "Insulex No. 22."

In assembling these parts, the sleeve 60 and insulator 40 are cemented together as described before the parts are mounted in the housing 30. The electrometer end of this unit is then inserted in housing 30 until the inner end of sleeve 60 seats on the shoulder 36, and the sleeve is formed with its inner portion of reduced diameter to provide an annular shoulder 65 which abuts the outer end of housing 30 when the parts are in the proper relative positions. The insulator unit and housing 30 may be cemented together as by a solvent bond if desired, but subsequent adjustment of these parts with relation to the scale 25 is facilitated if the sleeve 60 is not cemented to the housing but is formed to have a sufficiently snug fit in the housing to hold these parts together while still permitting their removal from the barrel as required for adjustment before they are sealed in place.

After the electrometer unit is mounted in housing 30, the objective lens 20 is inserted from the opposite end of the housing 30 in the passage 34, and before the lens is secured in position, the fiber 15 may be adjusted as required into proper position in the field of lens 20 by inserting a suitable tool through an opening 66 provided in the wall of chamber 31 and manipulating the electrode 14. This hole is shown as sealed with cellulose sealing tape 67 prior to insertion of the unit in barrel 10, and a peripheral groove is formed in the surface of housing 30 to receive this tape, which also serves to shield the hole 66 against the passage of secondary electrons emitted from the wall of barrel 10.

The objective lens 20 is then adjusted into accurately focused relation with the fiber 15 to position the loop of the fiber in the focal plane of the lens. This focusing is accomplished by means of an annular spacer 70 inserted between the lens and the shoulder 71 at the inner end of passage 34. This spacer also forms an optical aperture for the microscope aligned with and of the same diameter as the passage 32, and it has been found desirable to have available a plurality of these spacers of different thicknesses, ranging from 0.010 to 0.020 inch, which may be used selectively in the assembly of each instrument to adjust the lens to the proper spacing with respect to the fiber 15.

After a selected spacer 70 of the proper thickness is in place, the lens 20 is secured and sealed in position by means of a rubber O-ring 72 and a sleeve 73 of polystyrene or other suitable plastic, which is compressed against the O-ring 72 and secured in position by a solvent bond with the inner wall of passage 34. In this way, the lens 20 held securely in position even under conditions of substantial temperature ranges, since differences in thermal expansion between the lens 20 and the housing 30 are compensated for by the O-ring 72, which maintains pressure on the lens at all times to hold it firmly in position.

It is thus assured that the lens 20 and the electrometer fiber 15 will remain in accurately focused relation unaffected by temperature changes, since with the housing 30 and the insulator 40 and sleeve 60 formed of the same plastic material, or of different materials having the same coefficient of expansion, and secured together by a solvent bond, there will be no differential expansion of these parts. Also, with the insulator 40 and sleeve 60 of substantial length as shown and with the resulting large area of their peripheral surfaces permanently secured to and in closely fitting relation with the inner wall of housing 30 and barrel 10, a firm and rigid support is provided for the electrometer, minimizing the possibility of permanent deflection of the fiber under shock. Assurance is also provided against the possibility of the loop portion fiber 15 catching on or being accidentally forced through the adjacent large loop portion of electrode 14, e. g. as shown since the ends of the fiber extend around the outside of the offset portions of electrode 14 to which they are secured, and the fiber thus crosses the wire of the electrode twice at relatively large angles.

A diaphragm assembly indicated generally at 75 is mounted in the outer end of barrel 10 to seal the barrel and to support the charging pin 77 for the electrometer. This assembly includes a sleeve portion 80 and a flexible diaphragm portion 81 molded integrally therewith, and it also includes a central portion 82 of increased thickness which surrounds the charging pin 77, the pin being provided with a circumferential groove as shown into which the material of the diaphragm is molded to form an interlocked construction. At the outer end of this assembly is a supporting ring 85 of aluminum or other suitable material, which is provided with a circumferential groove 86 into which the material of the sleeve portion 80 of the diaphragm unit is integrally molded. This ring 85 supports the outer end of the sleeve 80 when the outer end of the barrel 10 is peened over at 88 to secure these parts in place, and it also aids in maintaining the seal between sleeve 80 and the barrel in the event of differential transverse expansion of the parts under changing conditions of temperature.

It is desirable to have the diaphragm assembly 75 of such properties as to assure hermetic sealing of the barrel while still providing for establishing contact of the charging pin 77 with the outer end 41 of the electrode 14. In addition, the diaphragm 81 should be adequately light transmitting to admit the desired light for illumination of the electrometer and scale, and it should possess sufficient insulating properties to prevent short circuiting of the source of charging voltage. Satisfactory results from both of these standpoints have been obtained from the diaphragm and sleeve molded from transparent cellulose acetate butyrate, and with the pin 77 formed of stainless steel and grooved as shown to provide for molding the center portion of the diaphragm in interlocked relation therewith. However, since the butyrate does not wet stainless steel, additional sealing is provided adjacent the pin by applying a coating of a suitable flexible adhesive such as Glyptal to the junction of the pin with diaphragm portion 82.

The shape of the diaphragm 81 as shown, with a single annular convolution between the sleeve 80 and the central portion 82, has been found helpful in reducing undesirable light refractive effects. In addition, it will be noted that the diaphragm is substantially thicker adjacent its central portion 82 than adjacent its peripheral connection with the sleeve portion 80, for example a thickness range from a maximum of the order of 0.011 inch to a minimum of the order of 0.005 inch for a diaphragm assembly approximately 0.375 inch in diameter. With this variation in thickness, flexing of the diaphragm takes place primarily in its outer portions, thus protecting the Glyptal coating against cracking such as might result from excessive flexing of the inner portion of the diaphragm. Also, with the flexing of the diaphragm taking place primarily at its periphery, less total flexing is required for a given amount of movement of pin 77, and this flexing takes place in the thinner portion of the diaphragm, thus reducing wear on the diaphragm as a whole and prolonging its useful life. With these proportions of the diaphragm and associated parts, the pin 77 can be moved from its retracted position shown in Fig. 2 through a distance of approximately 0.025 inch with a pressure of about 2.5 to 7 pounds.

At the eyepiece end of the device, the barrel 10 is counterbored to provide a portion of larger diameter terminating in an annular shoulder 90 which forms a seat for the scale disk 24, and it has been found desirable to secure the disk in position by applying a suitable adhesive to the shoulder 90 and the adjacent portion of the inner wall of the barrel before the disk is mounted in place, satisfactory results having been obtained by using B-7 Acryloid as the adhesive in the case of a glass disk 24 and aluminum barrel 10. A washer 91 is mounted adjacent disk 24 to form an optical aperture, and an aluminum spacer sleeve 92 is mounted between this washer and the eyepiece lens 25.

The outer end of sleeve 92 is provided with a circumferential groove 93 which receives an O-ring 95 against which the lens 25 is seated. An aluminum eyepiece ring 96 is positioned adjacent the outer surface of the lens, and these parts are shown as held in assembled relation by peening the outer end of barrel 10 as indicated at 97. Thus with the parts properly proportioned as shown, the O-ring 95 is compressed against sleeve 92 and the wall of barrel 10 to seal the interior at this end of the barrel and to hold lens 22 firmly under pressure preventing relative movement of these parts under conditions of differential expansion, and the eyepiece ring 96 holds lens 22 in recessed relation with the outer end of barrel 10 to protect the lens against abrasion or other injury in use.

In assembling the device, the housing and its associated parts may be mounted in the barrel 10 first, since if they require removal before they are finally installed in the barrel, they can be readily pushed out through the open end of the barrel before the eyepiece and scale are in place. The annular shoulder 99 within the barrel serves as a stop for positioning the inner end of housing 30, and a spring steel washer 100 formed with a cylindrically curved shape as shown in Fig. 4 is inserted between the outer end of the insulator portion 44 and the diaphragm assembly 80 following which these parts are secured in position by peening the outer end of the barrel at 28, additional sealing being provided by applying a coating of B-7 Acryloid between the end of the barrel and sleeve 80 and permitting the coating to dry partially before the peening operation. The washer 100 serves as an optical aperture, and it also exerts sufficient pressure longitudinally of the device to retain these parts firmly in assembled relation and thus to prevent relative movement of the parts in the event of differential expansion thereof under condition of temperature change. The eyepiece and its associated parts are inserted and held in place as already described, the scale being adjusted during insertion into the proper alignment of its calibrations with the loop portion of the fiber 15.

It will be apparent that with the charging pin 77 located in the center of the barrel at the substantially thickened portion 82 of the diaphragm 81, a considerable amount of the light which would normally be employed by illuminating the electrometer is cut off. The lens surface 45 at the outer end of insulator 40 compensates for this loss of light by acting as a condensing lens for the hollow tube of light rays transmitted by the diaphragm 81 and washer 100 and directs these rays sufficiently inwardly and along the axis of the device for adequate illumination of the fiber 15 for viewing through the microscope.

In the operation of the device, the electrometer is first charged by pressing the outer end of charging pin 77 in contact with a suitable external source of voltage and then forcing the pin inwardly by deflection of the diaphragm 81 with the outer end 41 of electrode 14. The device as shown is so adjusted that when fully charged, the image 15a of the fiber 15 will coincide with the zero mark on the scale 25, a suitable charging voltage being 150 volts in an instrument of the proportions and capacity given above. When the device is removed from the charging source, the diaphragm retracts to remove pin 77 out of contact with the electrode, and with the capacity of the device as high as described, it has been found unnecessary to provide an electrostatic shield for preventing deflection of the fiber. After the instrument has thus been charged, it is ready for use and may be carried in the pocket or otherwise attached to the clothing or person of a user working in the vicinity of a source of slow neutrons.

The operation of the device in measuring exposure to a slow neutron flux is due to the interaction of the slow neutrons with the nuclei of the boron atoms in the coating 37. When a neutron is absorbed, the boron nucleus becomes unstable and immediately throws off an alpha particle whose energy is about 2.5 m. e. v., the lithium atom which results having much less energy. The length of the path of this alpha particle in air is about 9 mm., which is slightly greater than the diameter of the ionization chamber 31 in a device of the proportions described. These particles cause ionization of the air in chamber 31, with resulting neutralization of the charge on the electrometer, and the consequent movement of the fiber 15 registers this alteration in charge on the scale 25 in proportion to the total quantity of ionization. At the same time, positive ions produced in chamber 31 are removed by the conducting surface of the housing 30 to prevent them from interfering with the desired operation of the device.

In general, gamma radiation is present in varying intensity at a neutron source, and its effect on the device should be considered. Since 32 electron volts are required on the average to make one ion pair, each of the alpha particles released from the boron coating produces 2,500,000/32 or approximately 80,000 ion pairs, and thus while only a small fraction of the slow neutrons that pass through the ionization may be captured, the ionization current therefore is quite large compared to the ionization from a gamma ray background of reasonable intensity. In fact, a device constructed as described, has been found to be about 50 times as sensitive to slow neutrons as to gamma rays.

The calibration of the device can be readily carried out by exposing it to a source of slow neutrons in conjunction with a similar device having no boron lining in its ionization chamber and calibrated as a gamma ray meter. The slow neutron sensitivity of the slow neutron device is then calculated by subtracting from its reading the reading of the gamma ray meter. This calibration is carried out before the final scale disk is installed in the barrel, and a scale of the proper length is then selected and installed to show the desired reading of the device, as measured by the deflection of the fiber resulting from slow neutron sensitivity.

When the device has been calibrated in this manner, the reading on the scale in use will represent in such large measure the effect due only to slow neutrons, that a gamma ray background of reasonable intensity can be neglected. However, in order to give maximum protection against both types of radioactivity, the user should also carry a gamma ray meter in order to determine individually the amount of exposure to both types of radiation. Then if the gamma ray meter indicates a gamma ray intensity which is greater than usual or expected, the user will be forewarned, since such increase in gamma ray intensity would not be as promptly observed on the slow neutron meter by reason of its much slower sensitivity to gamma radiation.

The sensitivity of the device, and accordingly the range over which it will measure can be changed by variation of several determining factors, including the volume of the ionization chamber, the number volts required for full scale movement of the electrometer fiber, the capacity of the electrometer system and the sensitivity of the boron coating. For example, with the ionization chamber approximately 2 cc. in volume and with the fiber and scale correlated to require a drop of 66 volts for full scale movement of the fiber, the device will measure up to 200 M. R. E. P. in a slow neutron flux with a capacity of 60 mmfd. for the condenser 50 and with a boron coating 37 as described covering the entire wall of chamber 31. With the same chamber volume and the same condenser capacity, 10 roentgens of gamma radiation would be required for full scale movement of the fiber. This range can be changed by multiplying it and the condenser capacity by the same factor.

It will thus be seen that the invention provides a device for measuring exposure to a slow or thermal neutron flux which is strong and rugged from the standpoint of resistance to shock and to varying conditions of temperature and moisture while at the same time being adequately small and light for convenient carrying about the person of the user. In addition, with the charging pin protected as shown by its recessed position within the open end of the barrel, there is little danger of accidental movement of the pin into such contact with the electrode 14 as to cause accidental discharge of the electrometer, and the device accordingly does not require a separate removable cap at this end of the barrel.

Reference is made to our copending applications Serial No. 131,091, filed December 5, 1949, and Serial No. 131,092, filed December 5, 1949, and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device for measuring exposure to a slow neutron flux comprising a supporting barrel, means forming an ionization chamber within said barrel, an electrometer supported within said ionization chamber, light transmitting means for sealing the end of said barrel while transmitting light to said chamber for illuminating said electrometer, means operable through said sealing means for applying a charge to said electrometer and including an opaque charging member cutting off a portion of the light transmitted by said sealing means to leave a hollow tube of light rays propagated towards said electrometer, an annular condenser mounted within said barrel between said sealing member and said electrometer and connected with said electrometer and said barrel to increase the capacity of said electrometer, a microscope and a scale mounted in said barrel for observing and measuring the position of said electrometer as determined by alteration in the charge thereon, means forming a lens surface between said sealing means and said condenser of larger diameter than the inner diameter of said condenser for directing said light rays inwardly and along the axis of said device to illuminate said electrometer for viewing through said microscope, and a coating on the surface of said chamber comprising a material adapted to undergo a neutron-alpha reaction when exposed to said slow neutron flux with resulting release of alpha particles for causing ionization of the air within said chamber and resulting alteration in the charge on said electrometer in proportion to the dosage of said flux.

2. A device for measuring exposure to a slow neutron flux comprising a supporting barrel, means forming an ionization chamber within said barrel, an electrometer within said ionization chamber, insulating means within said barrel supporting said electrometer, said insulating means including an elongated portion of lesser diameter than the inner diameter of said barrel, a tubular condenser mounted on said elongated portion of said insulating means, means connecting said condenser with said electrometer and said barrel to increase the capacity of said electrometer, transparent means for sealing the end of said barrel outwardly of said insulating means while transmitting light to said electrometer, means operable through said sealing means for applying a charge to said electrometer, a coating on the surface of said chamber comprising a material adapted to undergo a neutron-alpha reaction when exposed to said neutron flux with resulting release of alpha particles for causing ionization of the air within said chamber and resulting alteration in the charge on the said electrometer in proportion to the dosage of said flux, and means forming a lens surface between said sealing means and said electrometer for concentrating upon said electrometer the light transmitted by said sealing means.

3. A device for measuring exposure to a slow neutron flux comprising a supporting barrel, means forming an ionization chamber within said barrel, an electrometer within said ionization chamber, insulating means within said barrel supporting said electrometer, said insulating means including an elongated portion of lesser diameter than the inner diameter of said barrel, a tubular condenser mounted on said elongated portion of said insulating means, means connecting said condenser with said electrometer and said barrel to increase the capacity of said electrometer, transparent means for sealing the end of said barrel outwardly of said insulating means while transmitting light to said electrometer, means operable through said sealing means for applying a charge to said electrometer, a coating on the surface of said chamber comprising a material adapted to undergo a neutron-alpha reaction when exposed to said neutron flux with resulting release of alpha particles for causing ionization of the air within said chamber and resulting alteration in the charge on the said electrometer in proportion to the dosage of said flux, and means on the outer end of said elongated portion of said insulating means forming a lens surface for concentrating upon said electrometer the light transmitted by said sealing means, said insulating means being transparent to transmit said concentrated light to said electrometer.

4. A device for measuring exposure to a slow neutron flux over a relatively high range comprising a supporting barrel, a housing within said barrel forming an ionization chamber, an electrometer within said ionization chamber, an insulator supporting said electrometer within said housing, means securing said insulator in fixed relation with said housing to provide a firm and rigid support for said electrometer, a condenser mounted within said barrel externally of said ionization chamber, means connecting said condenser with said electrometer and said barrel to increase the capacity of said electrometer, a microscope and scale mounted in said barrel for observing and measuring the position of said electrometer, means for sealing the ends of said barrel, said sealing means being light transmitting to provide light within said barrel for illuminating said electrometer, said condenser being of tubular configuration to transmit said light through the central portion thereof, said insulator being of light transmitting material to transmit said light to said electrometer within said ionization chamber, means operable from outside said barrel through said sealing means for applying a charge to said electrometer, and a coating on the surface of said ionization chamber comprising a material adapted to undergo a neutron-alpha reaction when exposed to said slow neutron flux with resulting release of alpha particles for causing ionization of the air within said chamber and resulting alteration in the charge on said electrometer in proportion to the dosage of said flux.

OLE G. LANDSVERK.
LEONARD E. RASMUSSEN.

References Cited in the file of this patent

UNITED STATES PATENTS

| Number | Name | Date |
|---|---|---|
| 2,465,886 | Landsverk et al. | Mar. 29, 1949 |
| 2,601,637 | Rose et al. | June 24, 1952 |

OTHER REFERENCES

Landsverk: Atomic Energy Commission Document MDDS-395, December 13, 1945, 8 pp.

Atomic Energy Commission Document MDDC-396, April 22, 1936, pages 3 and 5.

Atomic Energy Commission Document MDDC-886, January 17, 1947, 4 pages.